(12) United States Patent
Gune et al.

(10) Patent No.: US 7,672,853 B2
(45) Date of Patent: Mar. 2, 2010

(54) USER INTERFACE FOR PROCESSING REQUESTS FOR APPROVAL

(75) Inventors: Prasad Gune, San Francisco, CA (US); Anthony Deighton, San Francisco, CA (US); Mingte Chen, Fremont, CA (US); Richard Kuo, San Mateo, CA (US); Wister Walcott, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1600 days.

(21) Appl. No.: 10/112,415

(22) Filed: Mar. 29, 2002

(65) Prior Publication Data

US 2003/0204427 A1    Oct. 30, 2003

(51) Int. Cl.
*G06Q 10/00* (2006.01)
(52) U.S. Cl. .................................................. 705/1
(58) Field of Classification Search ............... 705/1
See application file for complete search history.

(56) References Cited

U.S. PATENT DOCUMENTS

| | | | | |
|---|---|---|---|---|
| 5,177,342 | A * | 1/1993 | Adams ...................... 235/379 |
| 5,481,740 | A | 1/1996 | Kodosky |
| 5,710,921 | A | 1/1998 | Hirose |
| 5,831,611 | A | 11/1998 | Kennedy et al. |
| 5,870,712 | A | 2/1999 | Kiuchi et al. |
| 6,003,078 | A | 12/1999 | Kodimer et al. ............. 709/224 |
| 6,041,306 | A | 3/2000 | Du et al. |
| 6,067,523 | A * | 5/2000 | Bair et al. ...................... 705/3 |
| 6,115,646 | A | 9/2000 | Fiszman et al. |
| 6,145,096 | A | 11/2000 | Bereiter et al. ............... 714/25 |
| 6,230,287 | B1 | 5/2001 | Pinard et al. ................. 714/31 |
| 6,311,192 | B1 | 10/2001 | Rosenthal et al. |
| 6,519,332 | B1 | 2/2003 | Tovander .................... 379/196 |
| 6,763,335 | B1 * | 7/2004 | Nanbu et al. ................... 705/26 |
| 6,832,247 | B1 | 12/2004 | Cochran et al. ............. 709/223 |
| 6,910,018 | B1 * | 6/2005 | Okada et al. ................... 705/26 |
| 6,996,601 | B1 | 2/2006 | Smith .......................... 709/203 |
| 7,117,239 | B1 | 10/2006 | Hansen ....................... 709/200 |
| 7,283,969 | B1 | 10/2007 | Marsico et al. ................. 705/1 |
| 2001/0049615 | A1 | 12/2001 | Wong et al. |
| 2001/0049705 | A1 | 12/2001 | Murase et al. |
| 2002/0002481 | A1 | 1/2002 | Uchio et al. |
| 2002/0019836 | A1 | 2/2002 | Uchio et al. |
| 2002/0032596 | A1 | 3/2002 | Ohsaki et al. ................... 705/9 |

(Continued)

FOREIGN PATENT DOCUMENTS

EP         0703539         3/1996

(Continued)

OTHER PUBLICATIONS

Electronic Compliance And Approval Process, 2001.*

(Continued)

*Primary Examiner*—Naresh Vig
(74) *Attorney, Agent, or Firm*—Campbell Stephenson LLP

(57) ABSTRACT

A facility for presenting approval requests is described. The facility simultaneously displays information describing both a first approval request and a second approval request, where the first approval request is generated using a first application program, and the second approval request is generated using a second application program that is distinct from the first application program.

3 Claims, 13 Drawing Sheets

U.S. PATENT DOCUMENTS

| | | |
|---|---|---|
| 2002/0091586 A1* | 7/2002 | Wakai et al. ............... 705/26 |
| 2002/0102526 A1 | 8/2002 | Tsukamoto ............... 434/362 |
| 2003/0033167 A1 | 2/2003 | Arroyo et al. |
| 2003/0110228 A1 | 6/2003 | Xu et al. ............... 709/207 |
| 2003/0135403 A1 | 7/2003 | Sanderson et al. |
| 2003/0139962 A1* | 7/2003 | Nobrega et al. ............... 705/9 |

FOREIGN PATENT DOCUMENTS

| | | |
|---|---|---|
| EP | 0 822 473 A2 | 4/1998 |
| EP | 0 953 929 | 3/1999 |
| EP | 1065617 | 1/2001 |
| WO | WO 01/71621 | 9/2001 |

OTHER PUBLICATIONS

Silanis Electronic Approval Management, 2000.*
Electronic Compliance and Approval Process (ECAP) and No-Cost Seminars On Electronic Information Resources, May 2000.*
VCOM Introduces Internet Based ExpenseAnywhere Software, Oct. 15, 2001, PR Newswire.*

* cited by examiner

| My Approvals Inbox | | | | | | | |
|---|---|---|---|---|---|---|---|
| New | # 501 | Type 502 | Created By 503 | Description 504 | Received 505 | Status 506 507 | Multiple 508 ✓ ✗ |
| * | 0101 | Expense | JLEWIS | South Asia Trip | 04/10/01 | Received | ☐ ☐ |
| | | | | | | | ☐ ☐ |
| | | | | | | | ☐ ☐ |
| | | | | | | InQ 509 | Due 510 Past Due 511 |
| | | | | | | 0 days | 04/17/01 No |

SUBMIT

Expense Report Application

South Asia Trip
Period: 3/09-3/30
Amount: $11,000.00
Account: Marketing

SUBMIT — 690

APPROVALS INBOX USER SCREEN — 600

My Approvals Inbox

| New | # | Type | Created By | Description | Received | Status | Multiple | InQ | Due | Past Due |
|---|---|---|---|---|---|---|---|---|---|---|
| * | 0101 | Expense | JLEWIS | South Asia Trip — 621 | 04/10/01 | Received | ☒ ☐ | ☐ 0 days | ☐ 04/17/01 | ☐ No |
| | | | | | | | ☐ ☐ | ☐ | ☐ | ☐ |
| | | | | | | | ☐ ☐ | ☐ | ☐ | ☐ |

620

SUBMIT

*Fig. 9*

USER INTERFACE FOR PROCESSING REQUESTS FOR APPROVAL

TECHNICAL FIELD

The present invention is directed to the field of office automation, and, more particularly, to the field of processing requests for approval.

BACKGROUND

Many business organizations utilize approval processes that identify cases in which one member of the organization must submit a request for approval by another member of the organization. For example, an organization's approval process may require certain members of the organization to obtain their managers' approval each time they submit a time sheet recording the hours that they have worked. Typical approval processes may require members of the organization to submit such a request in a variety of other circumstances, such as the following: expense reports, time off requests, objectives & reviews, transfers, hires, promotions, training requests, incentive compensation requests, contracts, purchase orders, quotes, press releases, and content for web posting.

In a typical organization, some of these types of approval requests may be generated manually by the requester, then emailed to the approver. For example, transfer requests may be manually generated by requesters, then emailed to approvers. In many cases, a member of such an organization is required to act on a significant volume such emailed approval requests. Such emailed approval requests are interspersed among other types of incoming email messages, often making them difficult to identify as approval requests. It is sometimes difficult or impossible to determine whether—and how—a particular emailed approval requests has been resolved, or to identify those emailed approval requests that have been received but not resolved.

Other types of approval requests may be generated using one of a number of different application programs. For example, a time sheet application may be used to generate time sheets and submit them for approval, while a separate purchase order application is used to generate purchase orders and submit them for approval. In such cases, an approver may need to separately open each such application to act on the approval requests generated by it. In the above example, for instance, the approver may need to separately open the time sheet and purchase order applications in order to approve time sheets and purchase orders, respectively.

In view of the substantial shortcomings of the conventional approaches to processing approval requests discussed above, a more effective and user-friendly approach would have significant utility.

BRIEF DESCRIPTION OF THE DRAWINGS

FIG. 5 is a display diagram showing a typical approvals inbox display containing a single approval request.

FIG. 6 is a display diagram showing a typical display of additional information for a request shown in the approvals inbox.

FIGS. 8-11 are display diagrams showing additional user interface techniques provided by some embodiments of the facility for acting on pending requests.

DETAILED DESCRIPTION

I. Introduction

A software facility for processing approval requests ("the facility") is provided. In some embodiments, the facility presents a single user interface, sometimes called an "approvals inbox," for reviewing and acting on approval requests (hereafter simply "requests") generated by a variety of different applications. For example, where requests to approve time sheets are generated using a time sheet application and requests to approve purchase orders are generated using a purchase order application, the facility presents a single user interface for reviewing and acting on both time sheet requests and purchase order requests.

In some embodiments, the facility presents a user interface that enables users to act on several different requests by performing a single interaction, such as a single mouse click. For example, the user may perform a single interaction to approve four different requests.

In some embodiments, if a user responsible for acting on a request fails to do so within a particular period of time, the request is redirected to an alternative user. For example, where a user that is responsible for acting on a time sheet request fails to do so within a week of receiving the time sheet request, the time sheet request may be removed from the user's list of requests to act on and redirected to the user's manager.

In some embodiments, the facility displays visual indications identifying pending requests whose due dates have passed. For example, where each request is listed in its own row, the facility may display a positive indication in the intersection of the row with a "past due" column for requests whose due dates have passed.

In some embodiments, the facility enables a user to query a subset of his or her pending requests based upon their due dates. For example, the user may query pending requests whose due dates passed at least 2 days ago, or pending requests whose due dates are in the next week.

By providing user interfaces for acting on approval requests as described above, embodiments of the facility significantly streamline the process of acting on approval requests.

II. System Overview and Overall Architecture

Figure 1:
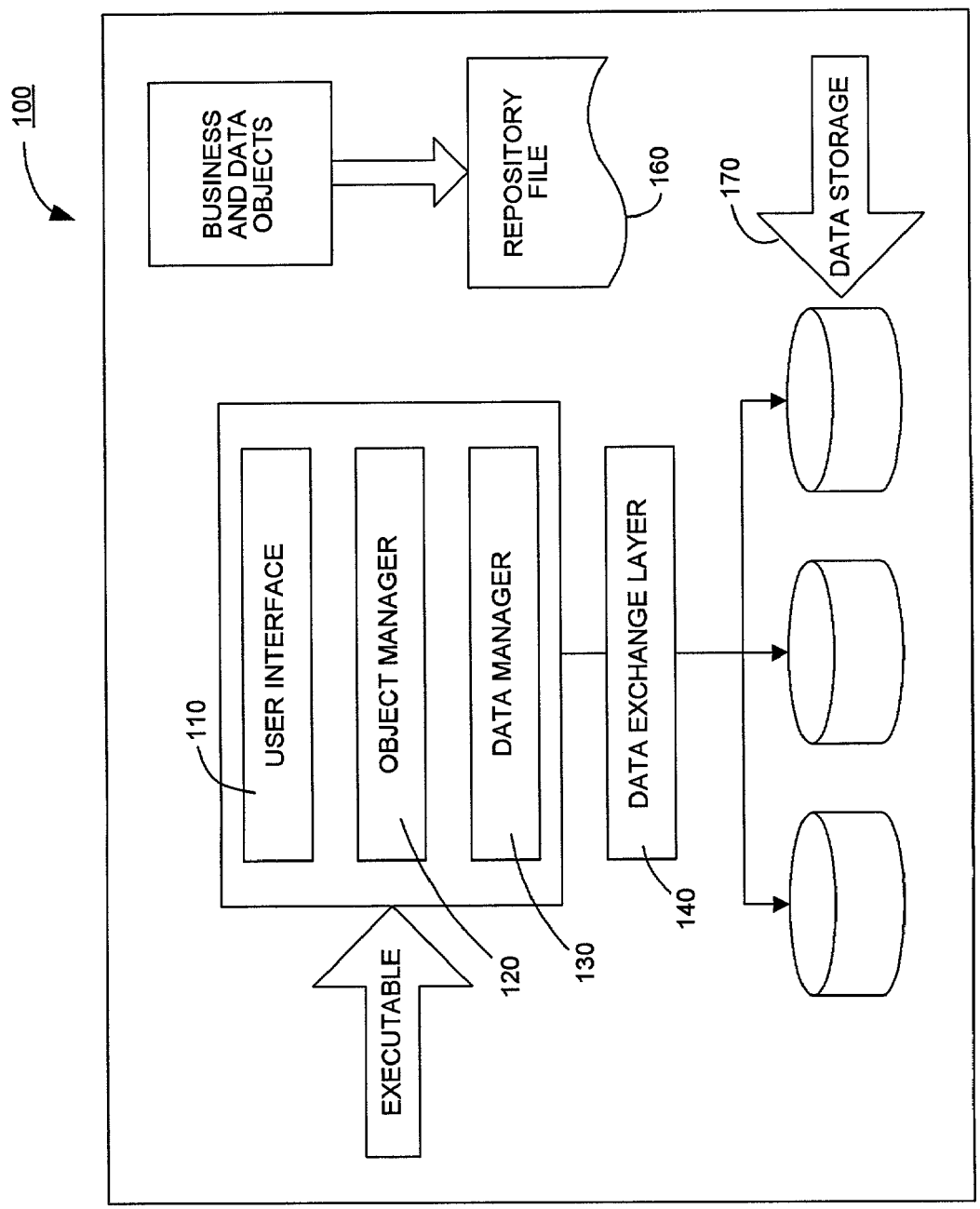
FIG. 1 shows a multi-layered system architecture in which the teachings of the present invention are implemented.

In one embodiment, a system in which the teachings of the present invention are implemented can be logically structured as a multi-layered architecture as shown in FIG. 1. In one embodiment, the logical multi-layered architecture as shown in FIG. 1 provides a platform for common services to support the various applications. These services may include a user interface layer 110, an object manager layer 120, a data manager layer 130, and a data exchange layer 140.

In one embodiment, the user Interface layer 110 may provide the applets, views, charts and reports, etc. associated with one or more applications. In one embodiment, various types of clients can be supported via the user interface layer 110. These various types of clients may include traditional connected clients, remote clients, thin clients over an intranet, Java thin clients or non-Windows-based operating systems, and HTML clients over the Internet, etc.

In one embodiment, the object manager layer 120 is designed to manage one or more sets of business rules or business concepts associated with one or more applications and to provide the interface between the user interface layer 110 and the data manager layer 130. In one embodiment, the business rules or concepts can be represented as business objects. In one embodiment, the business objects may be designed as configurable software representations of the various business rules or concepts such as accounts, contacts, opportunities, service requests, solutions, etc.

In one embodiment, the data manager layer 130 is designed to maintain logical views of the underlying data and to allow the object manager to function independently of underlying data structures or tables in which data are stored. In one embodiment, the data manager 130 may also provide certain database query functions such as generation of structure query language (SQL) in real time to access the data. In one embodiment, the data manager 130 is designed to operate on object definitions in a repository file 160 that define the database schema. In one embodiment, the data storage services 170 provide the data storage for the data model associated with one or more applications.

Figure 2:
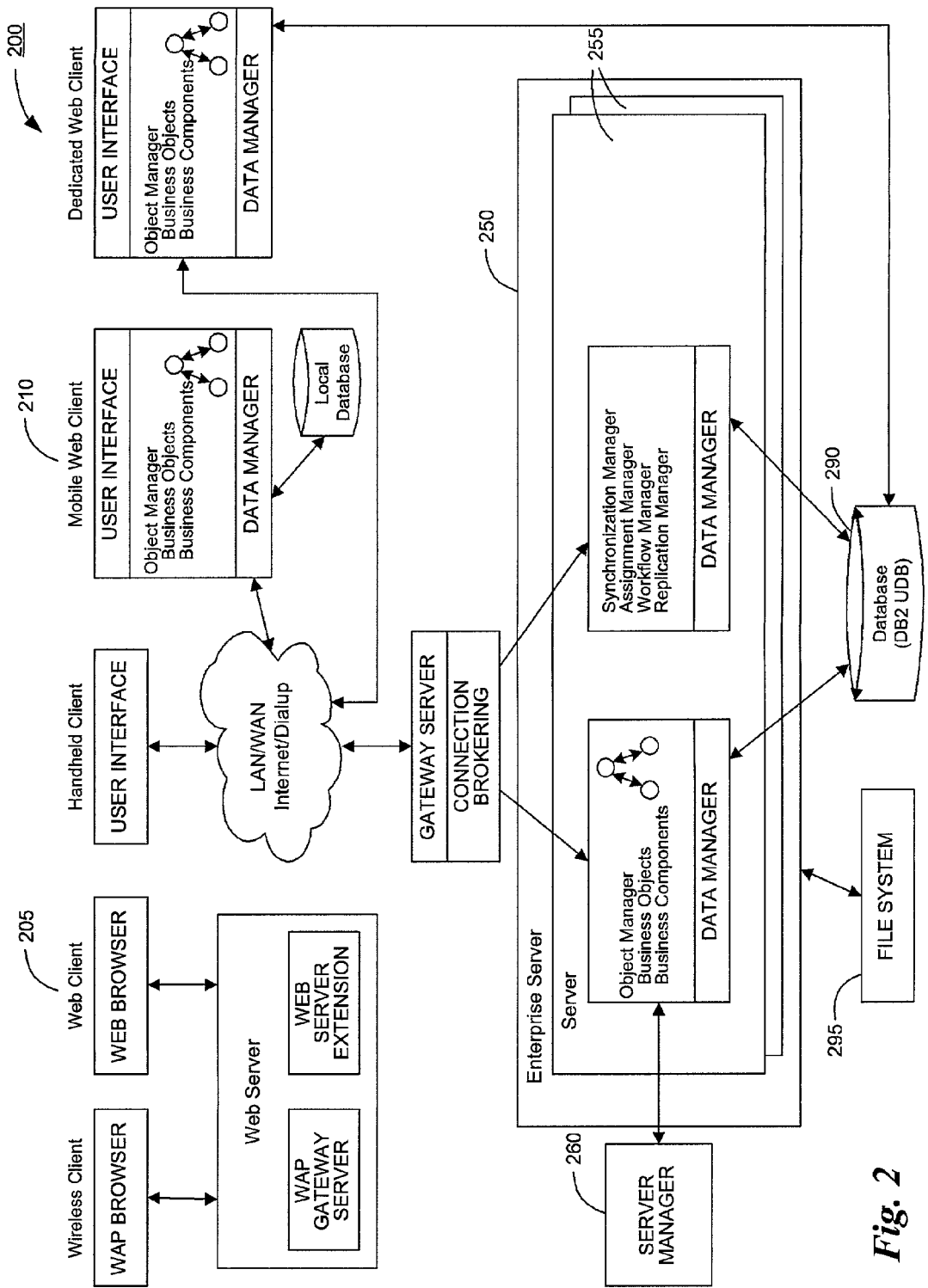
FIG. 2 shows a block diagram of one embodiment of a system configuration in which the teachings of the present invention are implemented.

In one embodiment, the data exchange layer is designed to handle the interactions with one or more specific target databases and provide the interface between the data manager layer 130 and the underlying data sources. FIG. 2 shows a block diagram of one embodiment of a system configuration in which the teachings of the present invention are implemented.

In one embodiment, the multi-layered architecture allows one or more software layers to reside on different machines. For example, in one embodiment, the user interface, the object manager, and the data manager can all reside on the dedicated web clients. For other types of clients such as the wireless clients, in one embodiment, the object manager and data manager can reside on a system server. It should be appreciated and understood by one skilled in the art that the system configuration shown in FIG. 2 is for illustrative and explanative purposes and may vary depending upon the particular implementations and applications of the teachings of the present invention.

In one embodiment, the system environment illustrated in FIG. 2 may include more than one database 290. One or more subsets of the database 290 can be created or replicated by a replication manager. In addition, mobile web clients can have additional remote databases (also called local databases). In one embodiment, unless the remote or local databases associated with the mobile web clients are defined as read-only databases, these mobile web clients can create and update data locally that will be ultimately propagated up to the primary database when each mobile web client synchronizes with the system server.

In one embodiment, the database 290 is designed to store various types of data including predefined data schema (e.g., table objects, index objects, etc.), repository objects (e.g., business objects and components, view definitions and visibility rules, etc.), and user's or customer's data. In one embodiment, dedicated web clients and server components, including those that operate in conjunction with the other types of clients, can connect directly to the database 290 and make changes in real time. In one embodiment, mobile web clients can download a subset of the server's data to use locally, and periodically synchronize with the server database through the system server to update both the local and the server database.

In one embodiment, various tables included in the database 290 may be logically organized into the following types: data tables, interface tables, and repository tables, etc.

In one embodiment, data tables may be used to store user business data, administrative data, seed data, and transaction data, etc. In one embodiment, these data tables may be populated and updated through the various applications and processes. In one embodiment, data tables may include the base tables and the intersection tables, etc. In one embodiment, base tables may contain columns that are defined and used by the various applications. In one embodiment, the base tables are designed to provide the columns for a business component specified in the table property of that business component. In one embodiment, intersection tables are tables that are used to implement a many-to-many relationship between two business components. They may also hold intersection data columns, which store information pertaining to each association. In one embodiment, intersection tables provide the data structures for association applets.

In one embodiment, interface tables are used to denormalize a group of base tables into a single table that external programs can interface to. In one embodiment, they may be used as a staging area for exporting and importing of data.

In one embodiment, repository tables contain the object definitions that specify one or more applications regarding:

The client application configuration

The mapping used for importing and exporting data

Rules for transferring data to mobile clients

In one embodiment, the file system 295 is a network-accessible directory that can be located on an application server. In one embodiment, the file system 295 stores the physical files created by various applications, such as files created by third-party text editors, and other data that is not stored in the database 290. In one embodiment, physical files stored in the file system 295 can be compressed and stored under various naming conventions. In one embodiment, dedicated web clients can read and write files directly to and from the file system 295. In one embodiment, mobile web clients can have a local file system, which they synchronize with the server-based file system 290 periodically. In one embodiment, other types of client such as the wireless clients and the web clients can access the file system 290 via the system server.

In one embodiment, the enterprise server 250 is a logical grouping of the system servers 255 that share a common table owner or a database, point to a common gateway Server, and can be administered as a group using server manager 260. In one embodiment, the connection to the gateway server can be established via TCP/IP. In one embodiment, the enterprise server 250 can be scaled effectively by deploying multiple system servers 255 in the enterprise server 250, thus providing a high degree of scalability in the middle tier of applications.

In one embodiment, the server 255 runs one or multiple server programs. It handles the incoming processing requests and monitors the state of all processes on the server. In one embodiment, server programs are designed and configured to perform one or more specific functions or jobs including importing and exporting data, configuring the database, executing workflow and process automation, processing to support mobile web clients for data synchronization and replication, and enforcing business rules, etc. In one embodiment, the server 255 can be an NT Service (under Windows NT operating system) or a daemon (e.g., a background shell process) under UNIX operating system. In one embodiment, the server 255 supports both multi-process and multi-threaded components and can operate components in batch, service, and interactive modes.

In one embodiment, the server manager 260 is configured as a utility that allows common control, administration and monitoring across disparate programs for the servers 255 and the enterprise server 250. In one embodiment, the server manager 260 can be used to perform the following tasks: start, stop, pause, and resume servers 255, components, and tasks; monitor status and collect statistics for multiple tasks, components, and servers within an enterprise server; and configure the enterprise server, individual servers individual components, and tasks, etc.

In one embodiment, the gateway server can be configured as a logical entity that serves as a single entry point for accessing servers. In one embodiment, it can be used to provide enhanced scalability, load balancing and high availability across the enterprise server. In one embodiment, the gateway server may include a name server and a connection brokering component. In one embodiment, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as a NT service. In a UNIX environment, the name server can run as a daemon process. In one embodiment, the connection brokering component is used to perform load balancing function such as directing client connection requests to an appropriate server (e.g., the least-busy server).

In one embodiment, as illustrated in FIG. 2, the various types of clients that can be supported by the system may include the following clients: dedicated web clients, mobile web clients, web clients, wireless clients, and handheld clients, etc.

In one embodiment, dedicated web clients (also called connected clients) are connected directly to a database server for data access via a LAN or WAN connection. In one embodiment, these connected or dedicated web clients do not store data locally. These dedicated web clients can also access the file system directly. In one embodiment, the user interface, the object manager, and the data manager layers of the multi-layered architecture reside on the dedicated web client.

In one embodiment, the mobile web clients are designed and configured for local data access and thus can have their own local database and/or local file system. In one embodiment, mobile web clients can interact with other components within the system via the gateway server. Through synchronization, the modifications from the local database and the server database can be exchanged. Mobile web clients are described in more detail below.

In one embodiment, a web client runs in a standard browser format from the client's machine. In one embodiment, the web client can connect to a system server 255 through a web server. In one embodiment, the system server 255 is designed and configured to execute business logic and access data from the database 290 and file system 295. In one embodiment, the web client described herein is designed and configured in accordance with the teachings of the present invention to operate in an interactive mode. In one embodiment, the interactive web client framework as described herein utilizes dynamically created objects implemented in JavaScript on the browser side that correspond to objects on the server side. In one embodiment, these dynamically created objects on the browser side may include the current view and its corresponding applets, the current business object and the corresponding business components, etc. The web client is described in more details below.

In one embodiment, wireless clients are essentially thin clients enabled on wireless devices. The wireless clients can use a wireless application protocol (WAP)-based user interface to communicate and exchange information/data with the system server.

The system configuration illustrated in FIG. 2 is described in more details below with references to various structures, databases, tables, file systems, etc. as illustrating examples.

Figure 3:
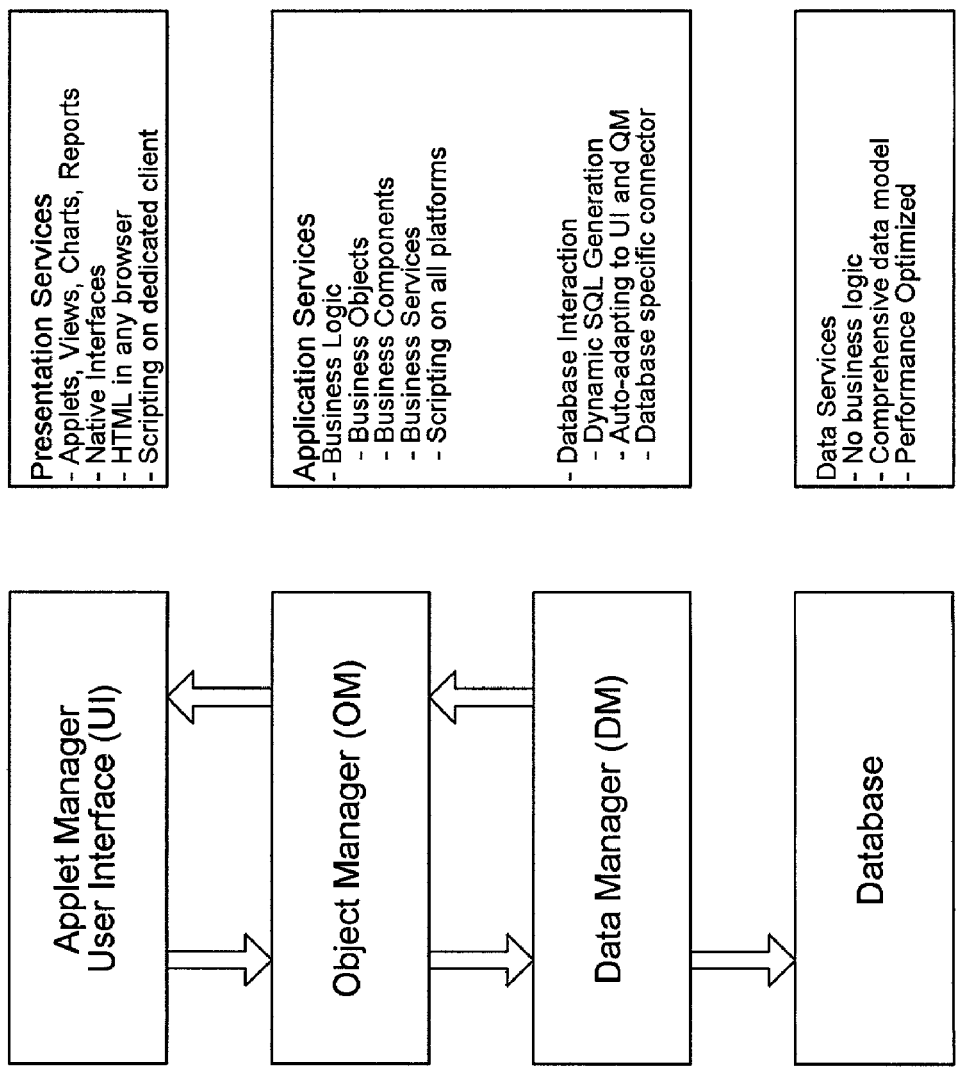
FIG. 3 shows a block diagram illustrating another logical representation of a multi-layered architecture in which applications can be built in accordance with the teachings of the present invention.

FIG. 3 shows a block diagram illustrating another logical representation of a multi-layered architecture in which applications can be built in accordance with the teachings of the present invention. Again, the multi-layered architecture as illustrated in FIG. 3 provides the configured platform for various common services designed and to support the various applications. In one embodiment, these various services may include presentation services logic layer 315 which corresponds to an applet manager and user interface layer 310, application services logical layer 325 which corresponds to an object manager (OM) layer 320 and a data manager (DM) layer 330, and data services logical layer 345 which corresponds to a database layer 340.

In one embodiment, the presentation services 315 may be designed and configured to support various types of clients and may provide them with user interface applets, views, charts, and reports, etc. As described above, a large variety of clients may be supported including wireless clients, handheld clients, web clients, mobile web clients, and dedicated (connected) clients, etc.

In one embodiment, the application services 325 may include business logic services and database interaction services. In one embodiment, business logic services provide the class and behaviors of business objects and business components. In one embodiment, database interaction services may be designed and configured to take the user interface (UI) request for data from a business component and generate the database commands (e.g., SQL queries, etc.) necessary to satisfy the request. For example, the data interaction services may be used to translate a call for data into DBMS-specific SQL statements.

In one embodiment, data storage services 345 may be designed and configured to provide the data storage for the underlying data model which serves as the basis of the various applications. For example, the data model may be designed and configured to support various software products and applications including call center, sales, services, and marketing, etc., as well as various industry vertical products and applications such as eFinance, eInsurance, eCommunications, and eHealthcare, etc.

Figure 4:
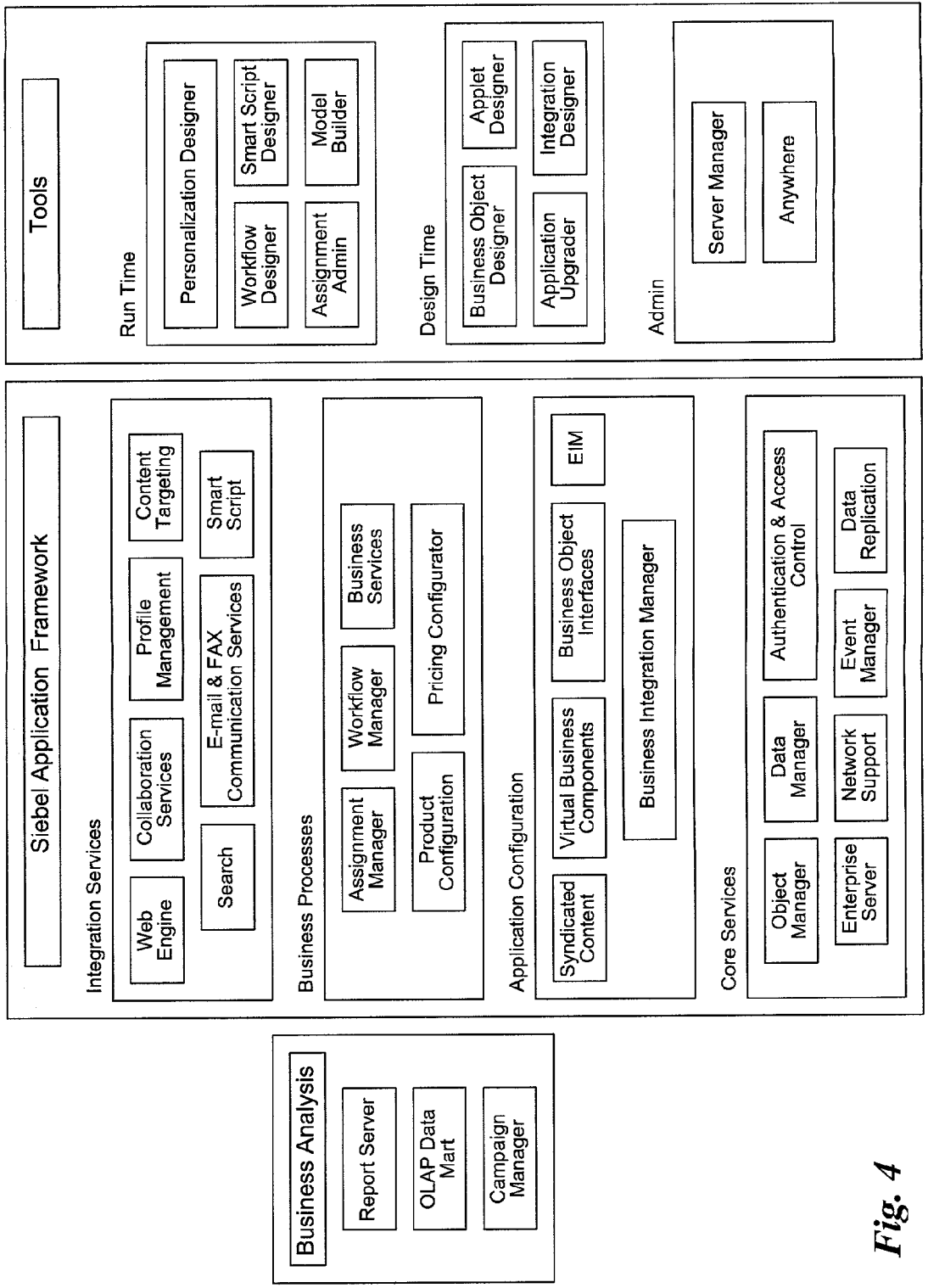
FIG. 4 illustrates a block diagram of one embodiment of an application framework in which the teachings of the present invention may be implemented.

FIG. 4 illustrates a block diagram of one embodiment of an application framework in which the teachings of the present invention may be implemented. As illustrated in FIG. 4, the application framework may include various logical groupings of various types of services and various types of tools that can be used to design and configure particular applications based on business needs and environments.

In one embodiment, the core services are designed and configured to provide the framework in which the applications execute. In one embodiment, the core services may include the following:

The enterprise server, which is the middle-tier application server

The networks that link all of these pieces together

Facilities like event manager and data replication, which allow sharing data between multiple installations of various applications as well as between the various applications and other external applications The authentication and access control, the security facilities.

In one embodiment, application integration services may be designed and configured to allow the various applications built in accordance with this framework to communicate with the external world. In one embodiment, the various types of services in this logical grouping may be designed and configured to provide for real-time, near-real-time, and batch integration with external applications. For example, these integration services may be used to enable communications between external applications and the internal applications using available methods, technologies, and software products. In one embodiment, application integration services allow the systems or applications to share and replicate data with other external enterprise applications. Accordingly, these services allow a particular application or system to be both a client requesting information, and a server having information requested from it.

In one embodiment, business processes services are designed and configured to allow the client to automate business processes through the application. In one embodiment, these various business process services may include the following:

Assignment of tasks through Assignment Manager

Enforcement of business practices through Workflow Manager

Reuse of custom business logic through Business Services

Ensuring proper product configuration and pricing through the Product Configurator and Pricing Configurator In one embodiment, creation of these business processes can be done through Run-Time tools such as Personalization Designer, Workflow Designer, SmartScript Designer, Assignment Administration Views, and the Model Builder, etc.

In one embodiment, integration services may be designed and configured to provide the client with user interface and thin client support. In one embodiment, these may include capabilities for building and maintaining web-based applications, providing web support facilities such as user Profile Management, Collaboration Services and Email and Fax services, as well as advanced Smart Scripting, etc.

In one embodiment, design time tools may be designed and configured to provide the services to customize, design, provide integration points, and maintain the application. These various tools provide one common place to define the application.

In one embodiment, admin services are designed and configured provide one place to monitor and administer the application environment. In one embodiment, these services allow the user to administer the application either through a graphic user interface (GUI) or from a command line, etc.

III. Facility and Its Implementation

To further describe the facility, its implementation and operation is discussed hereafter in conjunction with a number of display diagrams.

FIG. 5 is a display diagram showing a typical approvals inbox display containing a single approval request. As shown, the display 500 is a table divided into columns 501-511 and rows, such as row 520. Those of ordinary skill in the art will appreciate that the display may alternatively be organized in a variety of other ways. Each row corresponds to an approval request that can be acted on by the user to whom the approvals inbox is displayed. The user or users who are to act on each approval request may be determined in a variety of different ways, including those described in U.S. patent application Ser. No. 10/109,973, which is hereby incorporated by reference in its entirety. While requests are typically maintained in the approvals inbox until acted upon, in some embodiments certain requests are removed from the approvals inbox under other circumstances, such as when they are retracted by the user that created them, where a time period for acting on them has elapsed and they are accordingly delegated to another approver for action, or where action by another approver obviates action by the current approver.

Row 520 corresponds to a particular approval request, and contains information in each of the columns. It can be seen at Row 520's intersection with column 501 that the approval request is new—in other words, has never been displayed in the approvals inbox before; at its intersection with column 502, that the request bears request identifier number 0101; at its intersection with column 503, that the request's type is expense; at its intersection with column 504 that the request was created by user "JLEWIS"; at its intersection with column 505 that the request's description is "South Asia Trip"; at its intersection with column 506 that it was received on Apr. 10, 2001; at its intersection with column 507 that its status is Received—a variety of other statuses are possible, including Not Received, Acceptable, Approved, and Rejected; at its intersection with column 509 that the request has been displayed in the approvals inbox for zero days; at its intersection with column 510 that approval of the request is due on Apr. 17, 2001; and at its intersection with column 511, that the request is not past due.

FIG. 6 is a display diagram showing a typical display of additional information for a request shown in the approvals inbox. In FIG. 6, the user clicks on the description 621 of the request shown in row 620 to display additional information 690 about this request. In this example, the following additional information is displayed about the request: its description, the period of time to which it applies, the total expense amount, and a budget account against which the expense report is to be applied. In some embodiments, in order to display this additional information, the facility invokes the application program used to generate this approval request, here an expense report application.

Figure 7:
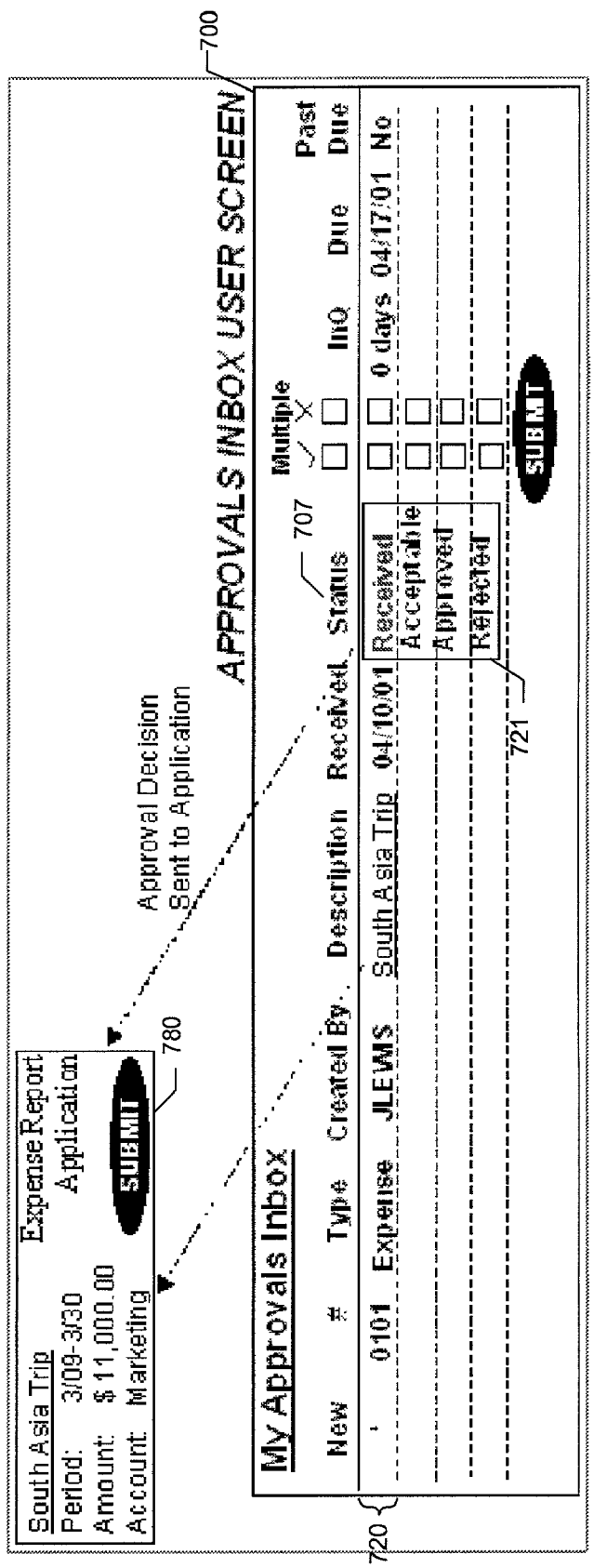
FIG. 7 is a display diagram showing a typical approvals inbox display in which the user is acting on a request.

FIG. 7 is a display diagram showing a typical approvals inbox display in which the user is acting on a request. By clicking on the current status of the request of row 720, the user has caused the facility to display a drop-down list 721 of possible statuses for this request. The user may go on to select a particular one of the statuses in the drop-down box in order to attribute that status to the request. For example, the user may select the Approved status in order to approve the request, or the Rejected status in order to reject the request. In some embodiments, this action causes the facility to send a resolution notification to the application program that was used to create the request, here the expense report application.

Figure 8:
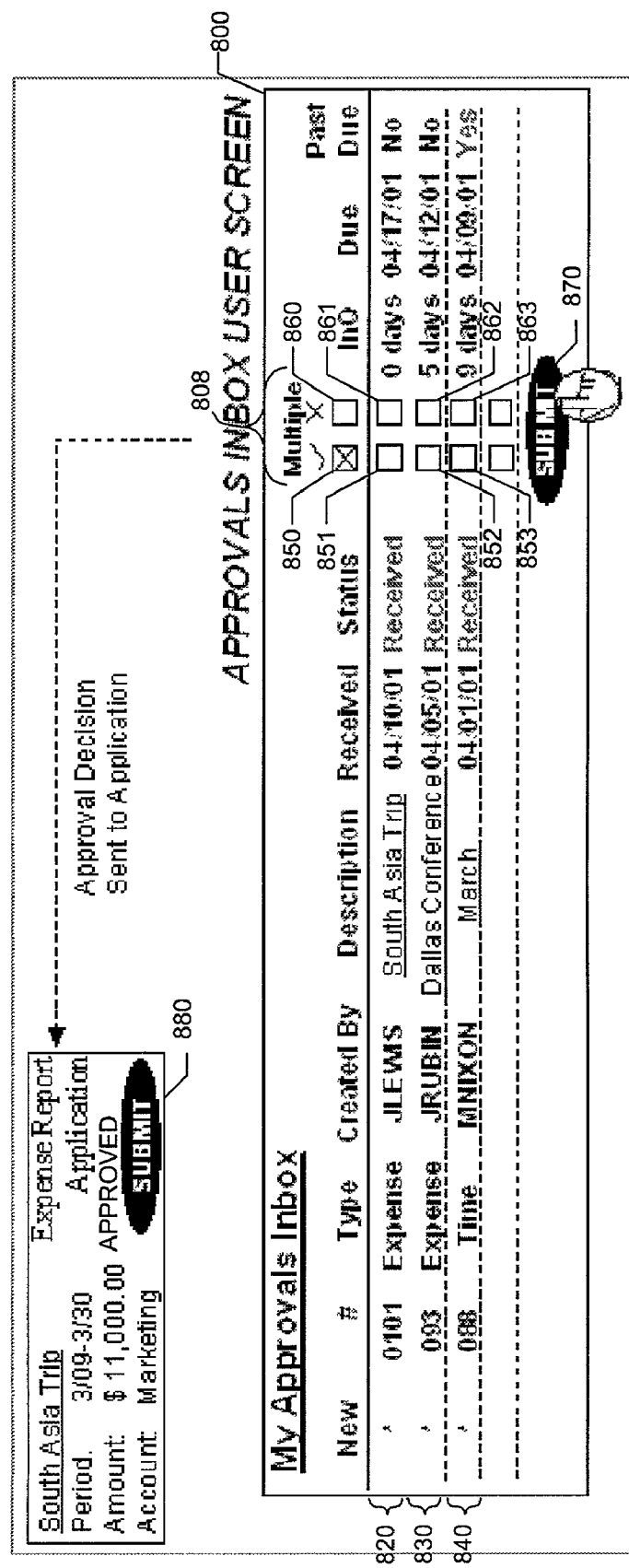

FIGS. 8-11 are display diagrams showing additional user interface techniques provided by some embodiments of the facility for acting on pending requests. FIG. 8 is a display diagram showing a first typical display of an approvals inbox containing three pending requests. In column 808, it can be seen that approve all check box 850 is checked. When the user subsequently clicks submit button 870, all three of the pending requests displayed in the approvals inbox are simultaneously approved. In some embodiments, this action causes the facility to send an approval notification to the application that was used to create each of the approved requests. In some embodiments, check box 850 is initially checked by default, enabling the user to approve all displayed requests by simply clicking the submit button 870.

Figure 9:
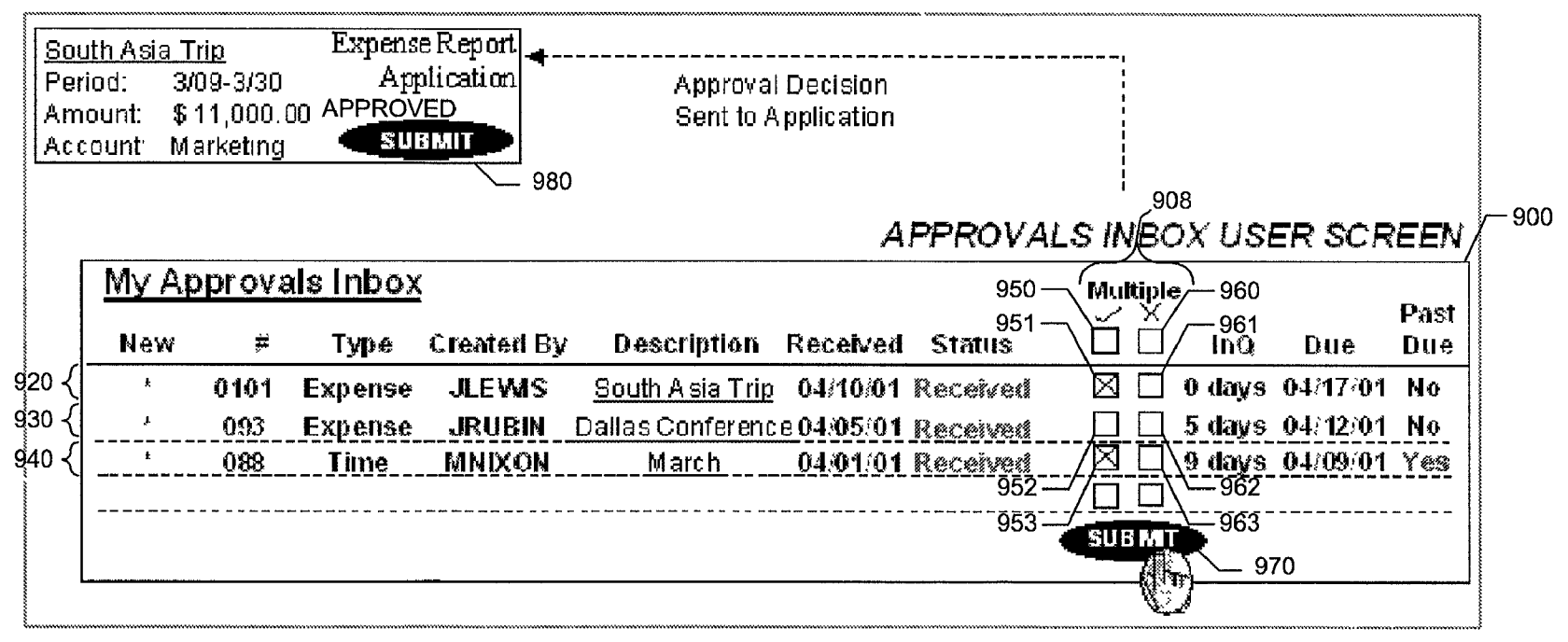

FIG. 9 is a display diagram showing a second typical display of an approvals inbox containing three pending requests. In column 908, it can be seen that approve all checkbox 950 and reject all checkbox 960 are both unchecked, enabling the displayed requests to be acted on individually. It can further be seen that approve checkboxes 951 and 953, in rows 920 and 940, respectively, have been checked. When the user subsequently clicks submit button 970, the requests represented by rows 920 and 940 are simultaneously approved.

Figure 10:
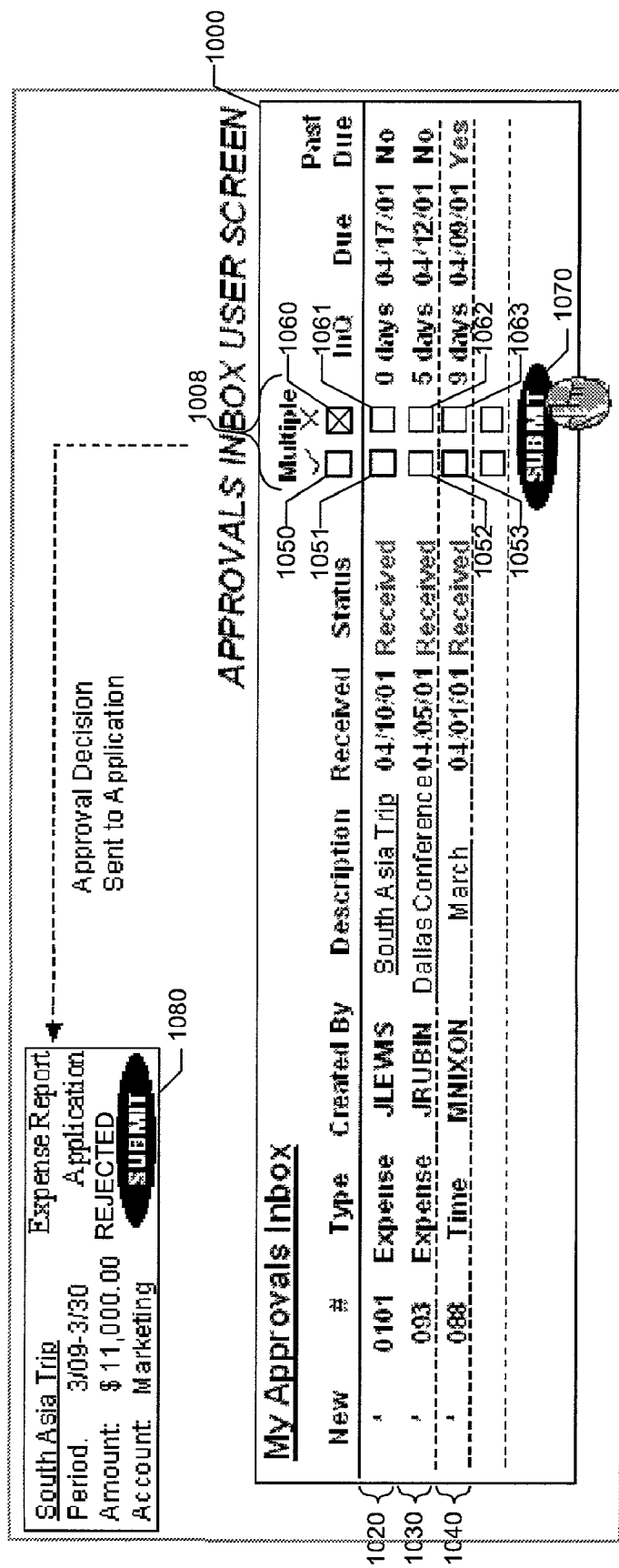

FIG. 10 is a display diagram showing a third typical display of an approvals inbox containing three pending requests. In column 1008, it can be seen that the user has checked reject all checkbox 1060. When the user subsequently clicks submit button 1070, all three of the pending requests displayed in the approvals inbox are simultaneously rejected. In some embodiments, this action causes the facility to send a rejection notification to the application program that was used to create each of the three requests.

Figure 11:
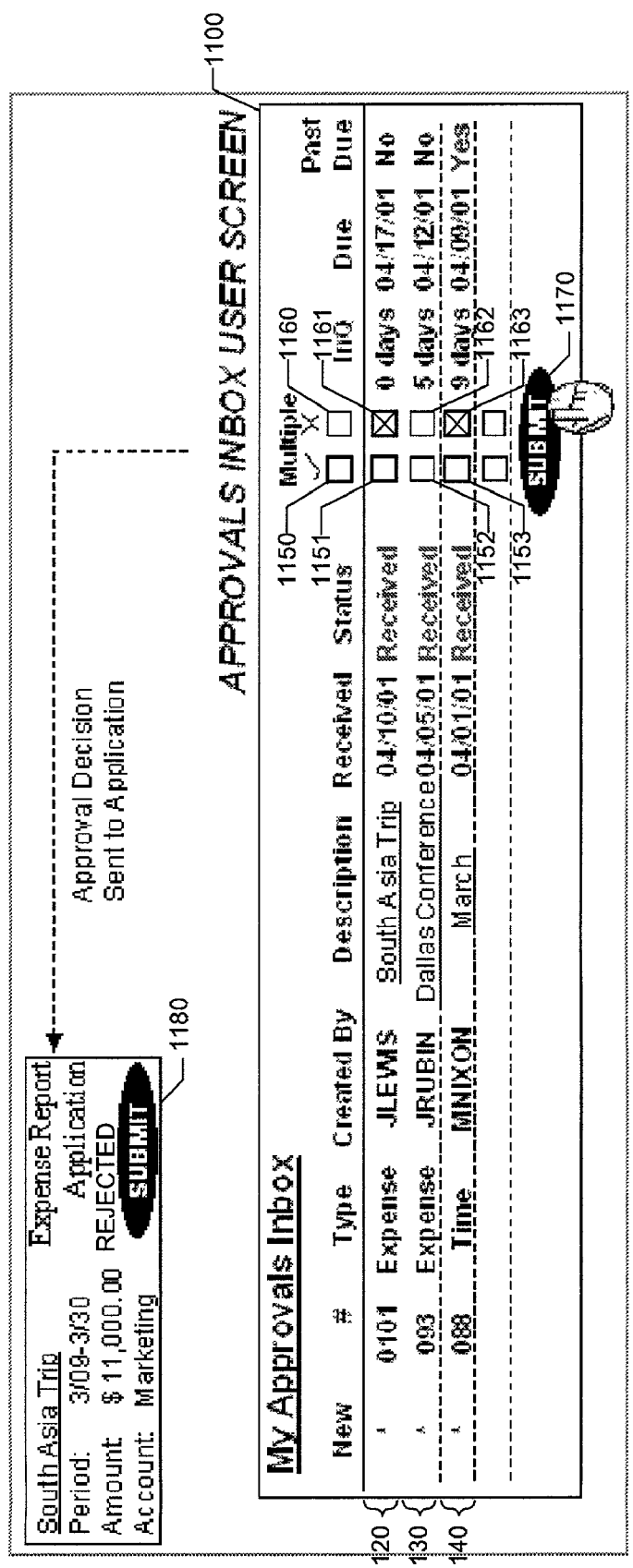

FIG. 11 is a display diagram showing a fourth typical display of an approvals inbox containing three pending requests. In column 1108, it can be seen that the user has checked approval checkboxes 1161 and 1163 in rows 1120 and rows 1140, respectively. When the user subsequently clicks submit button 1170, the two pending requests shown in rows 1120 and 1140 are simultaneously rejected.

Figure 12:
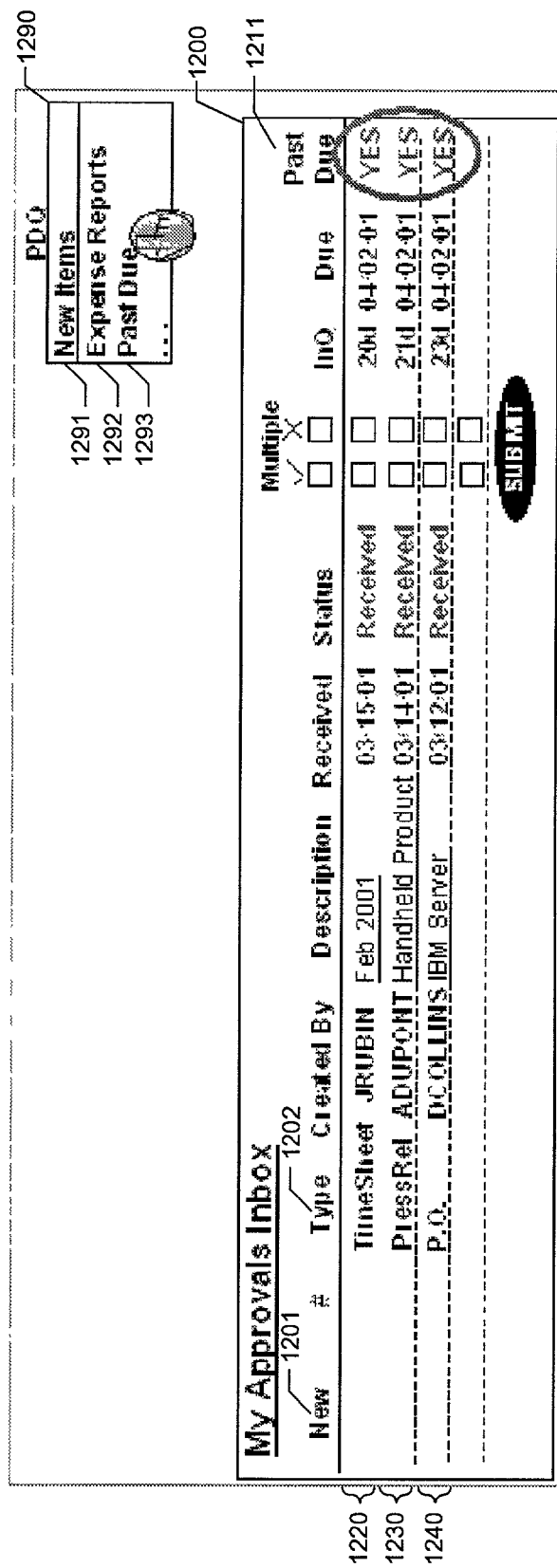
FIG. 12 is a display diagram showing the display of a filtered list of pending requests.

FIG. 12 is a display diagram showing the display of a filtered list of pending requests. The figure shows a "PDQ" menu that the user may use to filter the list of approval requests displayed in the approvals inbox. The menu includes such entries as New Items entry 1291, which, when selected by the user, restricts the requests displayed to those whose new flag in column 1201 is set; an Expense Reports entry 1292, that, when selected by the user, restricts the displayed requests to those indicated in type column 1202 to be expense reports; and a Past Due entry 1293 that, when selected by the user, restricts the displayed requests to those having "YES" in the past due column 1211. Approvals inbox 1200 shows the list of pending requests displayed by the facility when the user selects past due entry 1293, all of which are past due. Those of ordinary skill in the art will appreciate that a variety of other attributes may be used to filter the list of displayed requests.

Figure 13:
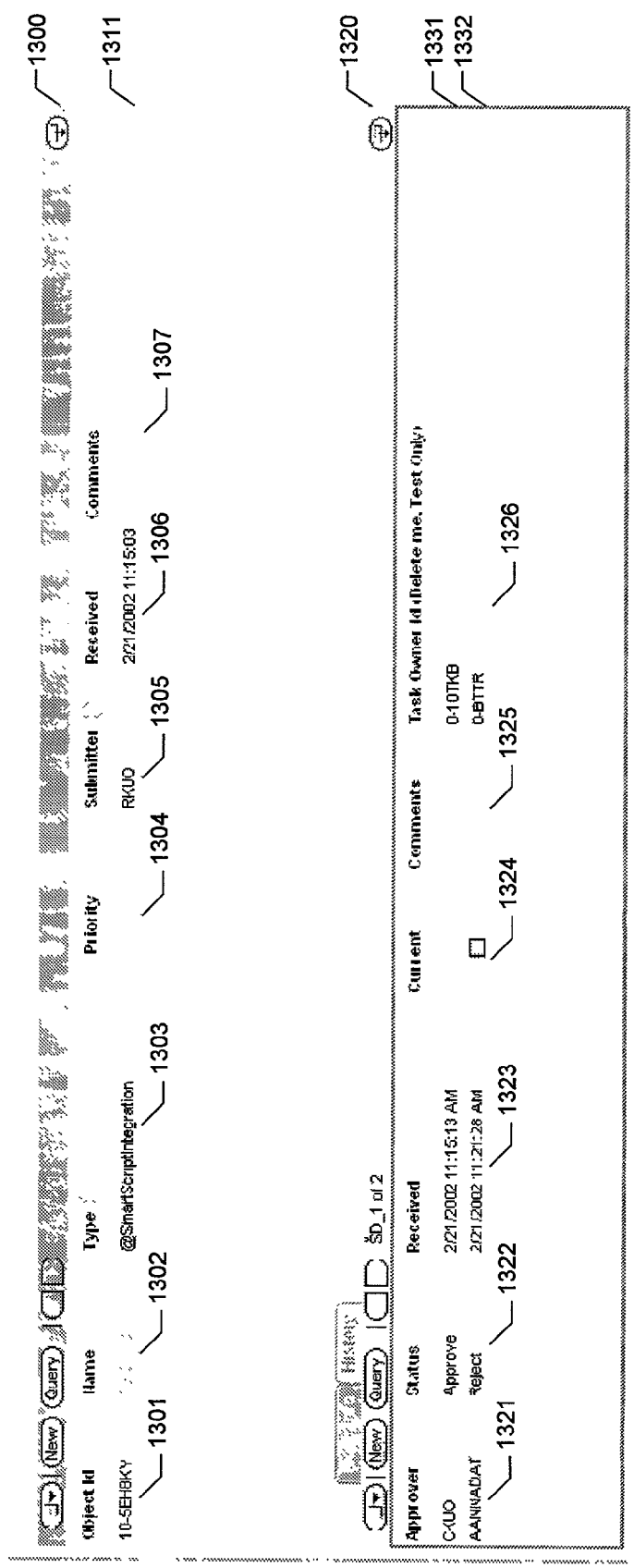
FIG. 13 is a display diagram showing the display of the approval history of a pending request.

FIG. 13 is a display diagram showing the display of the approval history of a pending request. Window 1300 contains a list of pending requests, here containing a single pending request 1311. Fields 1301-1307 are displayed for each listed pending request. Here, pending request 1311 is selected. Window 1320 shows the approval history of the request selected in window 1300. In particular, window 1320 shows approval actions 1331 and 1332 taken by foregoing approvers in the approval process for this request. For each action, window 1320 shows the identity 1321 of the approver; the status, or particular action taken, 1322; the date and time 1323 on which the request was received by the approver; whether or not the action is current 1324; any comments 1325 made by the approver; and a task owner identifier 1326.

In some embodiments, the facility provides an application programming interface (API) that may be called by applications that create approval requests in order to submit a newly-created request for presentation to the appropriate approver. In some embodiments, this API is provided as a business service. This API generally includes two methods: a Submit method is called in order to submit a new request for presentation to the appropriate approver, while a Withdraw method is called in order to withdraw a submitted request from presentation before it is acted upon.

When calling the Submit method, an application typically passes some or all of the information displayed for each request in the approvals inbox, such as an approval identifier, type, creator, description, and due date, as well as an indication of the various forms of resolution available for this request. The type of the request may be identified in terms of a particular business object class. When calling the Submit method, applications may additionally pass in such information as how to notify the application to display detailed information about the request, and how to notify the application of the resolution of the request selected by the approver. The information indicating how to notify the application to display detailed information about the request may identify a view of the underlying application in which to display detailed information about the request. In some embodiments, the Submit method returns an identifier that uniquely identifies the request within the facility, which may be used in subsequent communication between the application and the facility to identify the request.

When calling the Withdraw method, an application typically passes to the facility an identifier of the request to be withdrawn, such as an identifier assigned to the request by the application, or an identifier assigned to the request by the facility. An application may call with the Withdraw method for a particular request, for example, when the application that created the request is instructed by the user that created the request to retract the request. The user may so retract a request, for example, to correct an error discovered in the request after the request was created. Those of ordinary skill in the art will recognize that a variety of a other approaches may be substituted for submitting and withdrawing requests.

IV. Conclusion

It will be appreciated by those skilled in the art that the above-described facility may be straightforwardly adapted or extended in various ways. For example, any subset of the techniques described herein may be used by an embodiment of the facility. Virtually any type of request for approval may be processed by the facility, and requests may be resolved in a variety of other ways besides approving or rejecting them. Requests may be removed from display in a particular user's approvals inbox in cases in which those requests have not been acted on by the user. While the foregoing description makes reference to preferred embodiments, the scope of the invention is defined solely by the claims that follow and the elements recited therein.

We claim:

1. A method in a computing system, the method comprising:

receiving a first approval request among a plurality of approval requests from a first application program;

in response to receiving a query from at least one approver for additional information regarding the first approval request, invoking the first application program to retrieve the additional information regarding the first approval request;

receiving a second approval request among said plurality of approval requests from a second application program, wherein the second application program is distinct from the first application program, and the second approval request is of a different type of approval request from the first approval request;

in response to receiving a query from said at least one approver for additional information regarding the second approval request, invoking the second application program to retrieve the additional information regarding the second approval request;

presenting the first approval request and the second approval request to said at least one approver within a single user interface for reviewing and acting on the plurality of approval requests; and allowing said at least one approver to apply a common action to multiple approval requests from said plurality of approval requests via a single interaction with said single user interface.

2. The method of claim 1, further comprising:

in response to determining the at least one approver has not reviewed the first approval request within a predetermined period of time, redirecting the first approval request to at least one alternate approver.

3. The method of claim 1, further comprising:

displaying an approval history of a pending approval request within the single user interface.

* * * * *